(12) United States Patent
Dempster

(10) Patent No.: US 6,193,003 B1
(45) Date of Patent: Feb. 27, 2001

(54) LIGHTWEIGHT, PORTABLE, POWER-DRIVE UNIT AND ACCESSORY ATTACHMENTS

(76) Inventor: Harry E Dempster, 216 Bicknell, Santa Monica, CA (US) 90405

( * ) Notice: Subject to any disclaimer, the term of this patent is extended or adjusted under 35 U.S.C. 154(b) by 0 days.

(21) Appl. No.: 08/737,451

(22) PCT Filed: Nov. 17, 1996

(86) PCT No.: PCT/US96/17834

§ 371 Date: Oct. 23, 1996

§ 102(e) Date: Oct. 23, 1996

(87) PCT Pub. No.: WO97/18866

PCT Pub. Date: May 29, 1997

Related U.S. Application Data

(60) Provisional application No. 60/006,877, filed on Nov. 17, 1995.

(51) Int. Cl.[7] ................................................. B62M 27/02
(52) U.S. Cl. ........................ 180/180; 180/184; 180/190
(58) Field of Search .................................. 180/180, 190, 180/192, 19.1, 9.4, 181, 10; 280/11.21, 21.1; 305/4, 5, 160, 161, 180, 187, 191

(56) References Cited

U.S. PATENT DOCUMENTS

| 861,625 | * | 7/1907 | Wooley | 305/5 |
|---|---|---|---|---|
| 1,127,501 | * | 2/1915 | Palm | 305/191 |
| 2,345,496 | * | 3/1944 | Opheim | 180/180 |
| 2,393,309 | * | 1/1946 | Cochran | 180/180 |
| 2,814,811 | * | 12/1957 | Ritter | 280/21.1 |
| 3,374,036 | * | 3/1968 | Shaw | 305/191 |
| 3,750,777 | * | 8/1973 | Thompson | 180/180 |
| 5,332,058 | * | 7/1994 | Bianco | 180/180 |

FOREIGN PATENT DOCUMENTS

| 545834 | * | 10/1922 | (FR) | 305/4 |
|---|---|---|---|---|

* cited by examiner

Primary Examiner—Brian L. Johnson
Assistant Examiner—Bridget Avery
(74) Attorney, Agent, or Firm—Mitchell, Silberberg & Knupp LLP

(57) ABSTRACT

The device is a portable tractor with attachments for powering skiers, skaters, snowboarders, and the like. It employs a rigid pole to deliver the thrust to a belt which converts the thrust to a pull on the skier's lower back, leaving the skier's arms, hands, legs and feet free to perform their usual skiing functions. The pole also provides leverage to turn the tractor so that it follows the skier's movements. The device provides controls over the tractor's engine to the skier's hands, or to other parts of the skier's body. The tractor has crawler treads bearing retractable cleats which automatically convert into sled runners so the skier can travel downhill pulling the tractor without dismounting the tractor. The tractor can be folded up and transported by backpack. Various attachments enable use of the tractor to power skates, sleds, snowboards and similar vehicles.

15 Claims, 4 Drawing Sheets

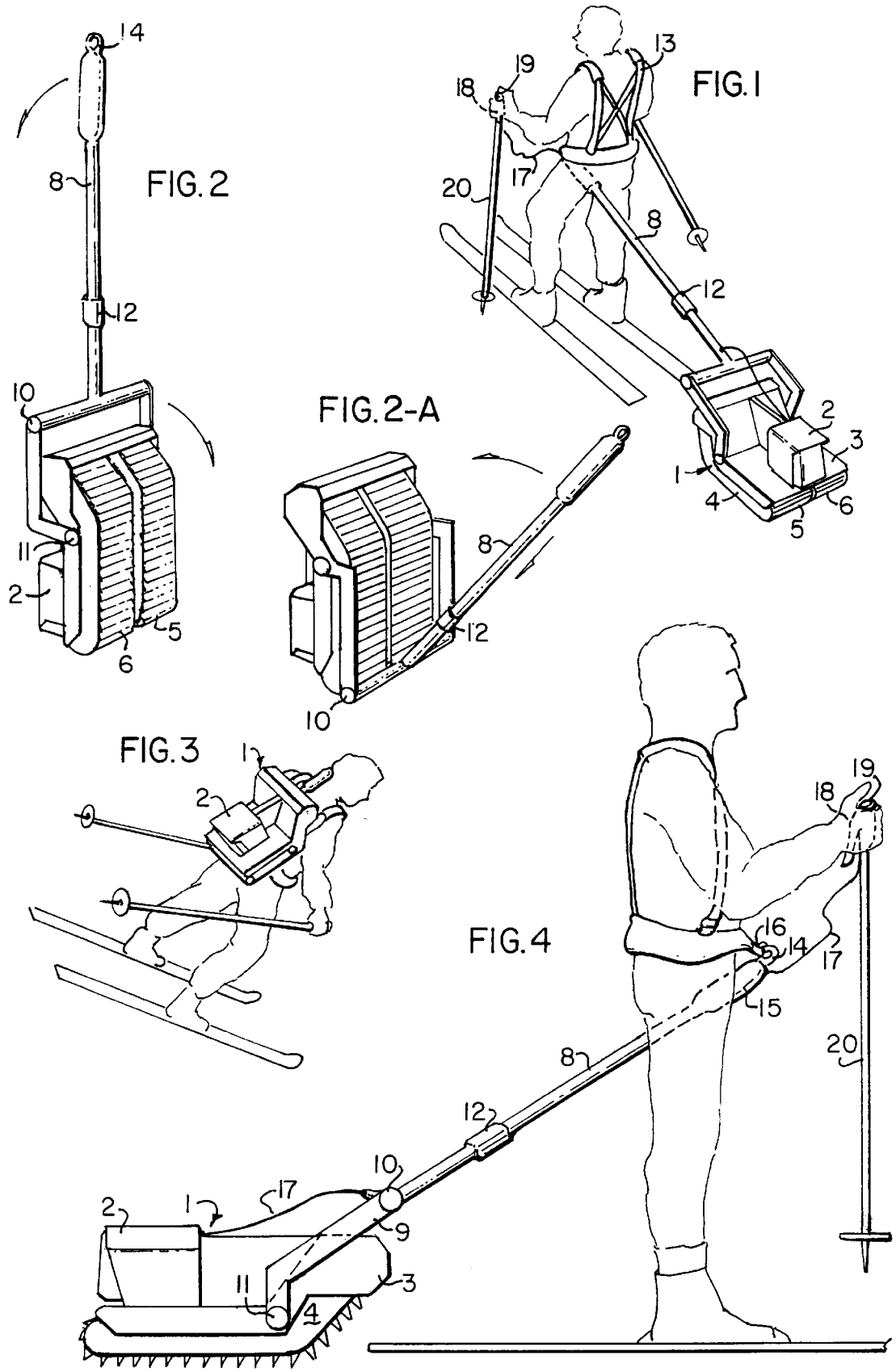

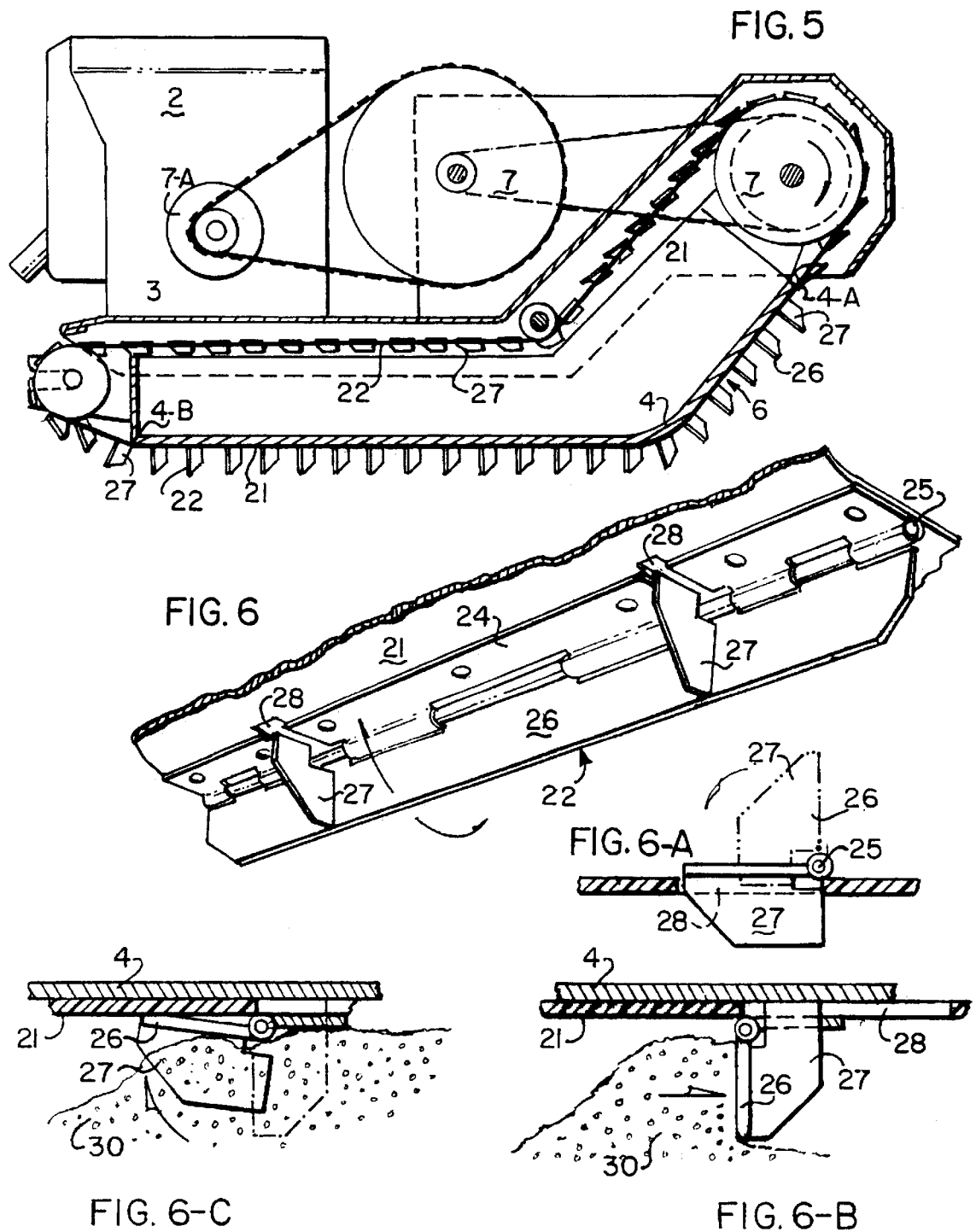

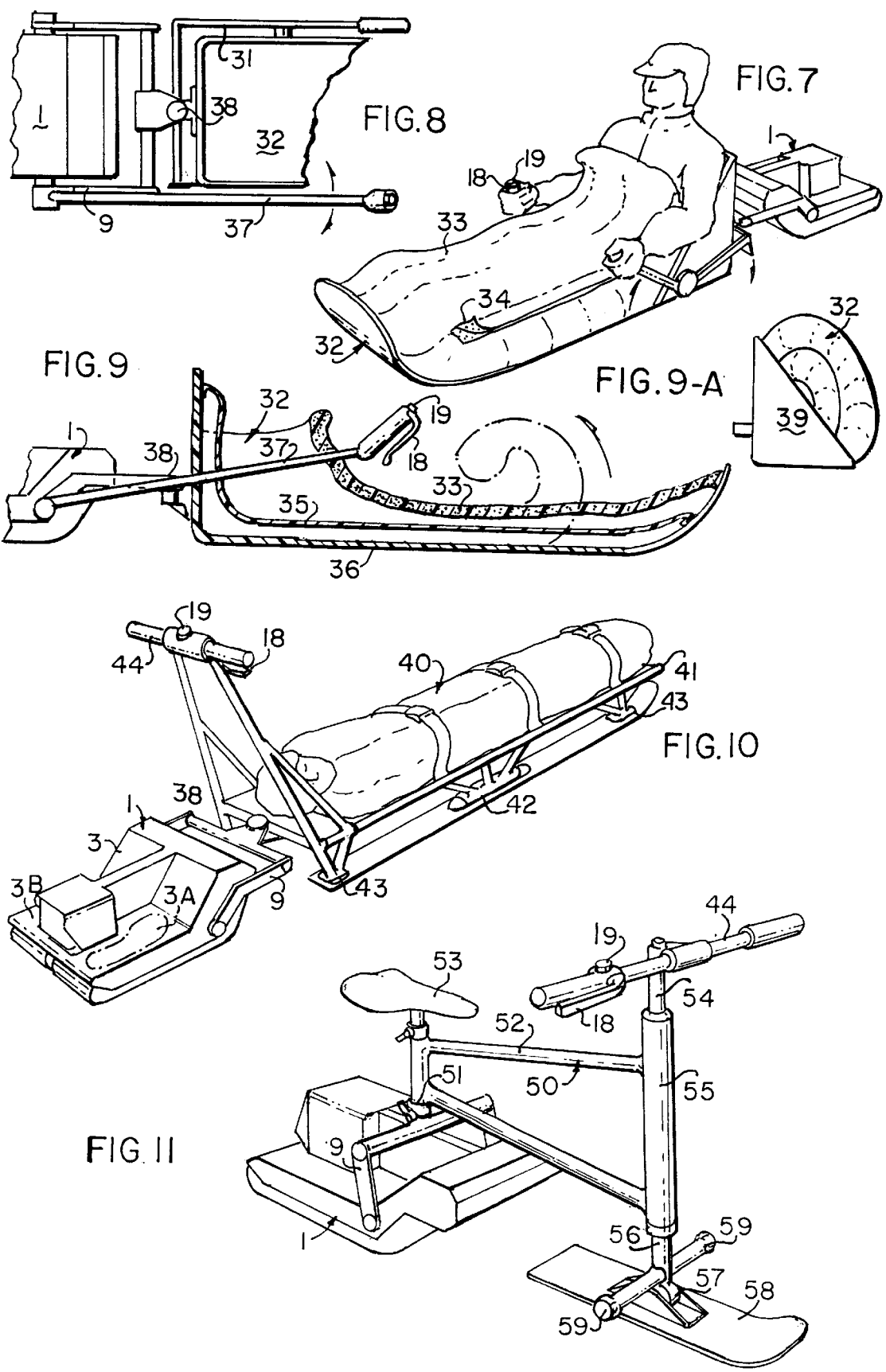

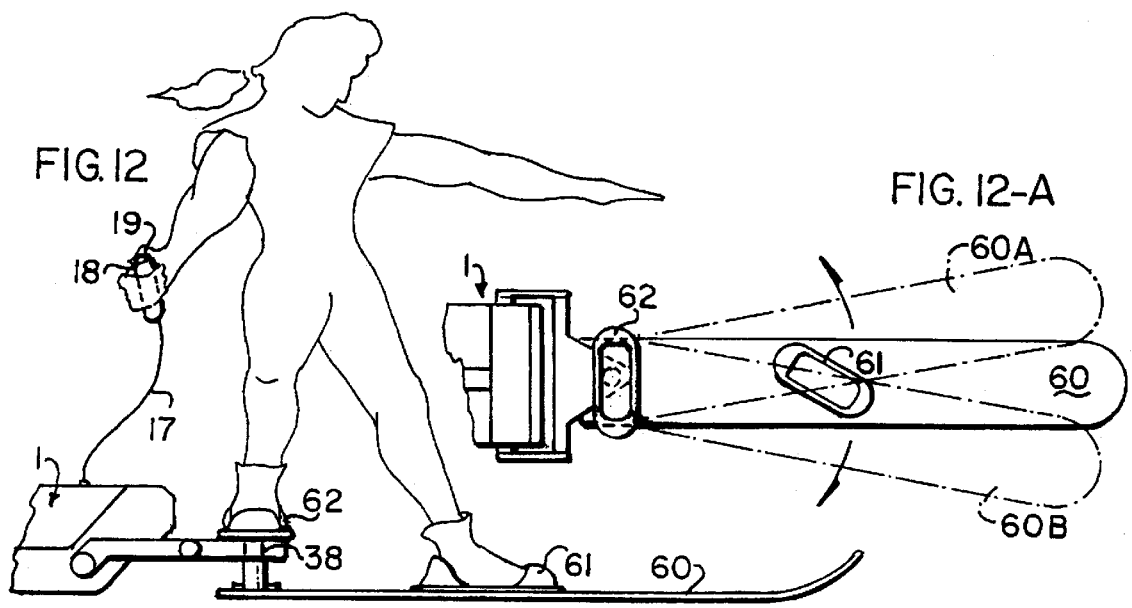
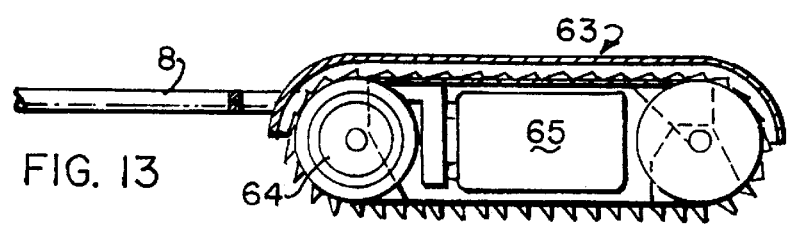
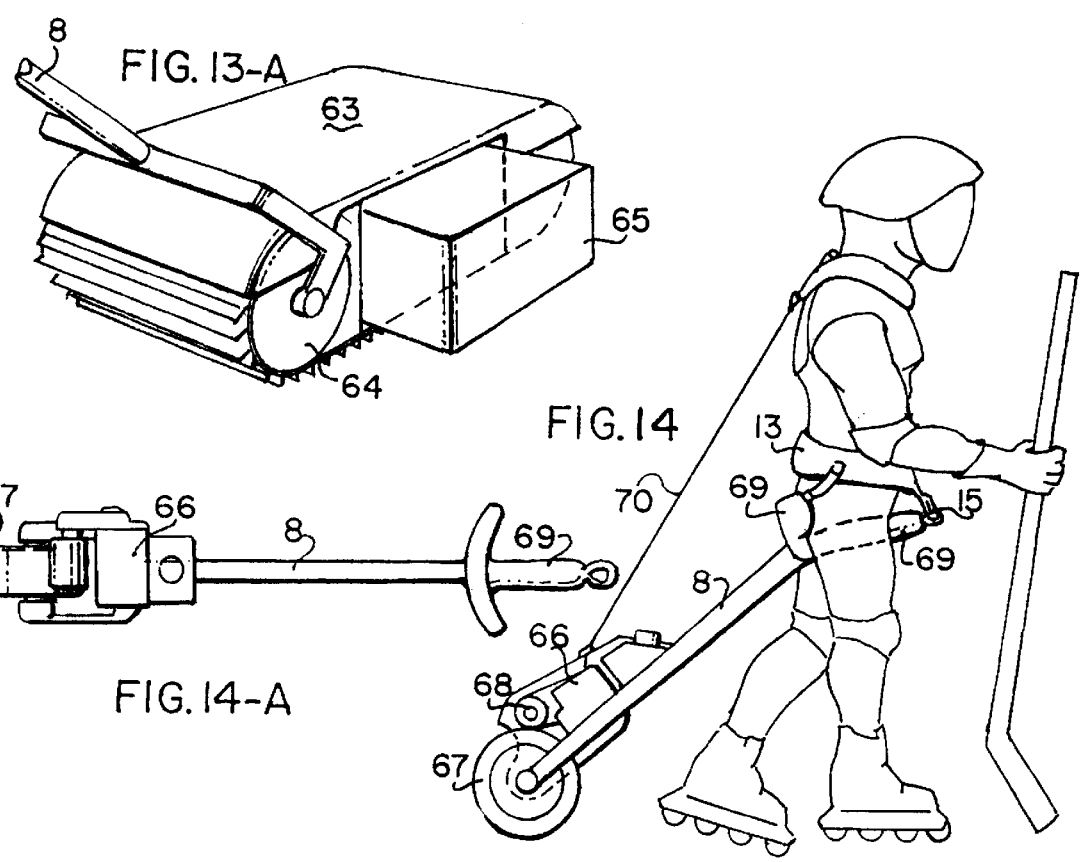

LIGHTWEIGHT, PORTABLE, POWER-DRIVE UNIT AND ACCESSORY ATTACHMENTS

This application claims the benefit of Provisional Application 60/006,877 filed Nov. 17, 1995.

BACKGROUND OF THE INVENTION

FIELD OF THE INVENTION

MORE DETAILED BACKGROUND OF THE INVENTION

A key task in the development of power devices for skiers is to allow the skier maximum degrees of freedom to control the skis while delivering efficient driving thrust.

The shifting of a skier's weight and posture comprise a principal means of controlling skis. It follows that the skier's control task is complicated, and control likely is impaired, to the extent that the operational requirements of a driving device limit the skier's posture and balance on the skis or limit the motion of the skis themselves. Of course, any driving device, by adding a new force into the skier's balancing task, necessarily complicates that task to some degree.

Where the driving thrust is directly applied to the skis themselves, the connection between the skis and the tractor necessarily limits the degrees of freedom of the skis, to the detriment of control. There is, of course, an advantage to driving the skis directly because this can reduce the stress on the skier's legs which otherwise are required to transmit the power to drive the skis uphill. The instant invention avoids direct drive on the skis, thereby leaving greater freedom of movement to the skis and greater potential control of the skis to the skier, but at the price of some additional stress on the skier's legs to transmit the power to the skis.

Where the driving thrust is applied to the body of the skier, that necessarily limits the degrees of freedom in the skier's posture and muscular control. This problem can be better illustrated by reference to some existing devices to power skiers.

For example, in the device of Mehne, U.S. Pat. No. 3,826,323, the driving thrust is delivered through rigid frame against the skier's buttocks and requires that the skier shift some body weight away from the skis onto the driving tractor. These requirements tend to limit or confine the skier's posture on the skis, thus reducing the degrees of freedom available to the skier's body to control the skis.

Mehne's device patented in 1974 shows an apparently rigid frame 7 which delivers thrust from a tracked tractor to the buttocks of the skier when the skier rests a portion, but not all, of his body weight onto frame 7. Frame 7, when used to drive the skier, is secured in position on the skier's buttocks by a belt 12. Frame 7 also is adapted to serve as a backpacking frame to carry the tractor when not in use. Mehne discloses that the proportion of the skier's weight which rests upon the tractor, through frame 7, is critical to efficient operation of the tractor. This is because the Mehne device alone, without some of the skier's weight, lacked sufficient traction. However, Mehne discloses that if the skier rests too much body weight on the Mehne device it requires an excessively heavy engine to achieve adequate speed. Mehne's device also includes straps 27 and 28 which attach the skier's ankles or boots to the tractor, for the purpose of limiting the separation between the skis and the tractor. Mehne's straps further limit the skier's freedom of movement.

In Allisio's device, as depicted in U.S. Pat. No. 4,519,470, the skier is delivered dual power thrust from both (A) the driven skis and also (B) rigid "ski sticks" (which apparently are the skier's own ski poles) that extend from the tractor between the skier's legs and bear a "seat" 35 which drives against the back of the skier's thighs. Allisio's "ski sticks" 37 are clipped together with a handle 4, and the tips of the ski sticks are inserted into a plate 39 to form a "rigid connection" to the crawler tractor. At the same time the tractor also drives the skis directly through plates 16 on the rear end of the skis which connect to plates 19 on an 'articulated connection' 15 to the tractor. It is apparent that adjusting these dual power thrusts on both the skier's thighs and on the skis may be critical to the skier's own balance, hence to control of the skis. It also appears that balancing these dual thrusts on the skier's thighs and the skis must to some extent dictate, and confine, the skier's posture on the skis. The skier's balancing task is further complicated by Allisio's disclosure that "a large part of the skier's weight acts on the self-propelled unit". Allisio Specification, Column 1, line 25. It appears, therefore, not only that the adjustment of the seat 35, relative to the tractor's driving connection to the skis, may be critical, but also that the skier's balancing of body weight between the seat 35 and the skier's feet on the skis may be critical.

In the Allisio device, the use of dual thrusts on both the skier'Is thighs and on the skis may be viewed as disadvantageous to the extent that it complicates a skier's balance on the skis by confining the skier's posture and compelling weight-shifting, while simultaneously also limiting the degrees of freedom of the skis themselves by the power thrust through a connection to the ski tails. In addition, the Allisio device requires use of the skier's hands on the handle 4 and deprives the skier of the normal uses of the hands and ski poles for balance and control.

RELATED ART

U.S. PATENT DOCUMENTS.

A variety of tractors and propulsion devices for skis exists.

One functional distinction in the prior art is between those tractors which attach to and directly drive the skis and those which drive the body of the skier rather than the skis.

Some of the many examples of devices which directly drive the skis are Van Voorhees, U.S. Pat. No. 2,625,229, issued Jan. 13, 1953; Gremeret, U.S. Pat. No. 3,568,787, issued Mar. 9, 1971; Thompson, U.S. Pat. No. 3,645,348, issued Feb. 29, 1972; Thompson, U.S. Pat. No. 3,710,881, issued Jan. 16, 1973; McLoed, U.S. Pat. No. 3,809,173, issued May 7, 1974; Husted, U. S. Patent No. 3,853,192, issued Dec. 10, 1974; Husted, U.S. Pat. No. 3,964,560, issued Jun. 22, 1976; and Husted, U.S. Pat. No. 4,035,035, issued Jul. 12, 1977.

A device which drives the body of the skier, rather than the skis, is Mehne, U.S. Pat. No. 3,826,323, issued Jul. 30, 1974. The device of Allisio, U.S. Pat. No. 4,519,470, issued May 28, 1985, drives both the body of the skier and the skis.

A control device for powered skis is disclosed by Shiber, U.S. Pat. No. 3,996,010, issued Jun. 29, 1976.

The foregoing list is intended as illustrative, not exhaustive.

SUMMARY OF THE INVENTION

The invention has several aspects. One aspect is comprised of a rigid pole and belt configured to deliver power to the body of a skier to move the skier uphill, while leaving the skier's hands free to use ski poles and the skier's feet and legs free to balance upon and control the skis. Modifications adapt the invention to power persons riding on snow boards, skates, skate boards, or equivalent devices.

Another aspect of the invention comprises hinged cleats on a crawler-type tractor, adapted to power skiers. The cleats engage the travelling surface when the tractor's forward motion is driven by the rotation of the treads, but the cleats fold back, disengage from the travelling surface and form a sliding surface when the tractor's forward motion is faster than the rotation of the treads. Thus, the cleats automatically engage when the treads are the driving force, as when travelling uphill or on the flat, but disengage, turning the tractor treads into sled runners so that the skier can ski downhill pulling the tractor. The cleats of the invention thus eliminate the necessity to dismount the tractor, fold it into a backpack, and carry it down slope on the skier's back. Of course, the tractor still can be folded into a backpack and carried when desired. A similar mechanism which allows a wheeled tractor's driving wheels to 'freewheel' downhill can be employed where a wheeled tractor is used to power a person on skates.

OBJECTIVES, FEATURES AND ADVANTAGES OF THE INVENTION

An objective of the invention is to deliver motive power from a tractor to a skier while leaving the skier's hands, feet and legs with freedom to control the skier's balance and the skis. It is a feature of the invention that it delivers motive power to a skier from a tractor without any connections delivering motive power from the tractor directly to the skis, or to the skier's hands, feet or legs, thus leaving them more available for use to control the skier's balance and the skis. An advantage of the instant invention is that it allows the skier to use hands and ski poles, though at least one hand does have the additional task of manipulating tractor engine controls supplied to the skier's hand(s) through one or more flexible wires or cables. In principle, the tractor also could be radio controlled through controls supplied to the skier's hands.

A further challenge in delivering motive power to a skier's body is to transmit the motive force to propel the body while minimizing interference with the skier's normal skiing motions. Among other things, this tends to retain a larger degree of the sense of 'free' skiing, as distinguished from passively riding a powered vehicle. The instant invention transmits a single pulling force through a flexible, rotatable connection between the driving pole and the focal point of the pulling force on the skier's body. This permits the skier some ability to rotate or swivel about the connection to the power pole. The focus of the pulling force on the skier's body preferably is at the lower back, waist or buttocks, which places the force pulling force near the skier's hip joints and near the center of gravity of the skier's body. Delivery of the pulling force at this point leaves the skier's body relatively free to rotate about the focal point of the pulling force, in a plane perpendicular to the pulling force. The flexible, rotatable connection of the pulling force to the skier's body also permits some freedom to swing from side to side, or up and down, relative to the rigid pole which delivers the pulling force. The focal point of the pulling force can be adjusted to some extent on the skier's body, according to the skier's preference. Thus, the instant invention allows the skier relatively great freedom to engage in many 'normal' or habitual skiing motions with minimal interference from the pulling force imposed at or near the skier's hips or waist.

A further feature of the invention is that the rigid pole or other structure which delivers the driving thrust from the tractor to the connection to the skier's belt also acts as a lever which transmits the skier's turning motions to the front of the tractor. The pole thus urges the tractor to turn following the skier's hips. In effect, the tractor tends to simply follow the skier under the urging of the rigid pole. This turning control over the tractor is particularly enhanced in the configuration where the skier is astride the rigid pole so that the skier's thighs apply the turning force directly to the pole. Of course, this turning leverage can be readily increased by simply increasing the length of the pole, and the length of the pole can be made adjustable to give a skier individualized control over the amount of this leverage.

Another challenge in the development of powered skiing is to keep the driving tractor and the thrust delivery system sufficiently light and compact to be comfortably portable. Note that both the Mehne and Allisio devices are designed to fold onto backpacking frames to be carried by the skier. Both Mehne and Allisio depict the skier as carrying the tractor in a backpack when skiing down hill. It is desirable to avoid having to pack up the tractor unit and carry it downhill, and particularly so where travel is overland, with a mixture of uphill and downhill terrain.

An objective of the invention is to enable the skier to travel downhill, as well as uphill, without dismounting the driving connection between the skier and the tractor. A feature of one species of the invention is hinged cleats on the treads of a crawler tractor, such that the cleats disengage from the travelling surface and become sled runners when the tractor's forward motion is faster relative to the travelling surface than is the rotation of the tractor's treads. The advantage is that the cleats engage the travelling surface when driven under the power of the tractor in uphill or flat conditions, but the cleats disengage so that the tractor treads turn into sled runners when travelling downhill. The skier has influence over this cleat-disengagement effect because the tractor has a centrifugal clutch. Engine controls are supplied to the skier's hand(s) through one or more cables so the skier can disengage the centrifugal clutch by reducing the engine speed, thereby slowing the tractor tread revolution and allowing the tractor's forward speed to retract the cleats. This allows the skier to ski downhill pulling the tractor on sled runners rather than having to dismount the tractor and carry it downhill.

Another species of the current invention connects the engine controls to the skier's shoulders or other upper body so that the skier can activate the engine controls by leaning away from or towards the tractor. For example, the controls can be set up so that if the skier leans or crouches forward, away from the tractor, the engine throttle is advanced, speeding up the engine, while if the skier leans back, or stands up out of the crouch, the engine is slowed. This provides the skier with hands-free control of the engine speed.

DESCRIPTION OF PREFERRED EMBODIMENTS

One aspect of the invention is an improved thrust-delivery system for powering skiers, which allows a high degree of freedom to the skier. The sole thrust is delivered through a rigid drive pole 8 which passes between the skier's legs and which is flexibly, rotatably connected at the skier's front to a belt worn about the skier's waist or lower back. The skier thus is drawn forward by the pull of the guide pole through the flexible, rotatable connection against the belt, with the pole being pushed by a tractor from behind the skier. The belt, when combined with harness straps over the shoulders, can be adjusted to deliver the pull from the drive pole over a wide range of positions on the skier's body, from thighs up through mid-back. The belt usually is adjusted to focus the pull on the skier's waist or lower back, thus leaving greater degrees of freedom to maneuver hips, legs and feet to control the skis. The skier's hands remain free to use ski poles, while controls for the tractor are provided to the skier's hands through flexible wires or cables. There is no direct connection between the driving tractor and the skis so that control of the skis comes entirely through the skier's feet. This configuration leaves more degrees of freedom for the skier to shift his weight and balance to control the skis and to employ ski poles. Persons knowledgeable in the art will perceive that the belt harness can be adjusted by the skier to the best lancing posture for the particular skier's needs and skiing style. The length of the drive pole, and the shape of the tab which connects the pole to the belt worn by the skier, also can be adjusted, thereby altering the vector of the force delivered by the drive pole to the belt. This adjustment is significant because angle of the drive pole relative to the ground determines, in part, the size of the vertical component of the force which the drive pole imposes downward on the front of the driving tractor. This downward component of force is important to the traction and efficiency of the driving tractor. Note, for example, that both the Mehne and Allisio devices require such a downward component of force on the driving tractor for it to perform properly. Persons having skill in the art will perceive that the drive pole passing between the skier's legs as depicted in the drawings could be replaced by a structure which curves around one or both of the skier's sides, rather than between the skier's legs, to produce equivalent results.

In another aspect of the invention, the cleats on the tractor's driving treads are hinged so that when the tractor is not moving forward faster than the treads are revolving, the cleats grip into the snow. However, when the tractor is moving forward faster than the treads are revolving the tread cleats automatically rotate backwards, retracting to convert the treads to a smooth sliding surface. Thus, when the tractor is moving forward faster than its own treads are revolving, the tractor treads act as sled runners. With this improvement, the tractor can be towed downhill by the skier and thus does not need to be dismounted, packed up, and carried downhill on the skier's back. The instant invention also can be folded into a backpack and carried on the skier's back when desired. Alternatively, the tractor's retractable cleats permit the skier and the deployed tractor to be towed by some other power source which moves faster than the tractor treads revolve under the tractor's own power.

In other aspects of the instant invention, it can be modified to power skaters, snow-boarders, and sleds as depicted in the drawings. In one version, the tractor is equipped with a lightweight, inflatable sled which can be carried in a pack and deployed as needed. The user thus could employ the tractor in an emergency to transport an injured person, or could transport other objects.

Of course, the energy source for the tractor's engine could be combustion, electric batteries, or other energy source.

BRIEF DESCRIPTION OF THE DRAWINGS

FIG. 1 is a perspective view of a skier being propelled up a hill by the power-driver unit, while wearing a belt-harness connecting system that can also be used to back carry the unit on the down hill run. FIG. 2 is a perspective view of the power-driver unit in a vertical position with the power pole extended.

FIG. 2A is a perspective view of the power-driver unit with the power pole being folded into a pack position.

FIG. 3 is a perspective view of a skier skiing down hill with the power-driver unit strapped to his back.

FIG. 4 is a side view of the power-drive unit connected to the power pole attached to the users belt-harness and showing the throttle/kill switched attachment at the ski pole.

FIG. 5 is a longitudinal cross section view of the gas power-driver unit and the folding snow cleat system.

FIG. 6 is a perspective detail view of the drive belt and folding snow cleat.

FIG. 6A is a cross section detail view of snow cleat positioned on the top side of the belt run over open top of lower frame.

FIG. 6B is a cross section detail view of the snow cleat positioned on the bottom side of the belt run, under closed lower frame, while in the power mode.

FIG. 6C is a cross section detail view of the snow cleat positioned on the bottom side of the belt run in a open non-powered slide mode.

FIG. 7 is a perspective view of a roll-up inflatable sled connected to a power-driver unit.

FIG. 8 is a parcel top view of the roll-sled showing control and connecting means to the power unit.

FIG. 9 is a longitudinal cross section view of a roll-up inflatable sled and a partial side view of the power-driver unit and control bar.

FIG. 9A is a side view of inflatable sled deflated and rolled into a storage mode.

FIG. 10 is a perspective view of a sled gurney connected to the power-driver system FIG. 11 is a perspective view of a snow bike connected to a power-driver system.

FIG. 12 is a side view of power unit attached to a snow board, showing the user's riding/control position.

FIG. 12A is a top view of the snow board control attachment system showing range of movement.

FIG. 13 is a longitudinal cross section side view of an electric power-driver unit.

FIG. 13A is a perspective view of the electrical power-driver unit with it's battery or fuel cell in the extended removal/replacement mode.

FIG. 14 is a cut away longitudinal side view of a small power driver, control-connecting rod and throttle system for skating unit.

FIG. 14A is a top view of the small skating power driver control system.

DETAILED DESCRIPTION OF THE DRAWINGS

Referring now to FIGS. 1, 2, 2A, 3, 4 and, 5, showing a portable drive unit 1 powered by a two cycle gasoline engine 2 which is mounted on a upper frame 3, with a lower frame 4 supporting two snow tracks 5 and 6. Power is transferred from the engine to the tracks through a centrifugal clutch 7A by a chain drive system 7. The skier is pulled forward by power pole 8 which is attached to the lower frame by fork 9 having locking pivot points 10 and 11. Power pole length can be adjusted or the pole can be dismantled by loosening adjustment clamp 12. The skier rides astride the power pole over the padded saddle 15 with his belt harness 13 attached to the end of the power pole at eyelet 14 with a quick release clip 16. The drive unit is controlled by cable 17 which runs from the engine through the power pole to a hand controlled throttle 18 having a kill switch 19 located at the top ski pole 20.

FIG. 1 shows the portable power unit 1 in uphill driving configuration.

FIG. 2 shows the portable power 1 unit in a vertical position with power pole 8 extended.

FIG. 2A shows the guide pole 8 being folded at pivot points 10 and 11 and pole shortened at adjustment clamp 12 to fold into the packing position.

FIG. 3 shows the system in a back packing configuration attached to belt-harness 13.

FIG. 4 shows the system in a fully extended operation configuration.

FIG. 5 is a longitude section view of the power unit showing the interior of the driver system.

Referring to FIGS. 5, 6, 6A, 6B and, 6C, the chain drive system 7 (FIG. 5) having a centrifugal clutch 7A, drives tracks 5 and 6. Each track consisting of a drive belt 21 and a series of hinging snow cleats 22. When under power belt 21 rotates in a clockwise direction moving the hinging snow cleats 22 around frame 4, as it moves from the open top of frame 4 it will contact the closed frame bottom at point 4A which will push against stop/support 27 causing the bite leaf 26 to rotate on axis pin 25 to an extended position (FIG. 6B) catching the snow and power the unit forward (power mode). As long as bite leaf 26 is under frame 4 (in the power mode), hinge stop 27 will bear on the bottom of frame 4 to support the bite leaf 26 in an extend position pushing against the snow. As the belt rotation reaches point 4B there is no longer support for hinge stop 27 and the pressure of the snow will force the stop through belt opening 28 and the bite leaf will rotate to a closed position. This allows folded cleat 22 to pass under frame section 3 (FIG. 6A.) . When the system is not under power and belt 21 is no longer moving (FIG. 6A) the forward momentum of the power unit 1 over the snow 30 will force bite leaf 26 to swing to an open position allowing the snow 30 to move uninhibited under cleats 22, putting the system into a sled mode. When in a sled mode, a skier can ski down a slope in a normal fashion controlling the power unit's direction with the power pole 8 with no resistance from the snow cleats 22. When the power is reapplied the rotation of belt 21 over the snow 30 forces the bite leaf 26 to return to an extended supported position pushing the system forward in a power mode (FIG. 6B) . The skier can then power up the next slope.

FIG. 6 perspective detail of typical section of drive belt 21 showing a hinging snow cleat 22 attached to belt by leaf 24 having axis pin 25 attached to bite leaf 26 having support stops 27, which can pass through belt 21 at slots 28.

FIG. 6A longitudinal section detail of hinging snow cleat 22 as it passes over the top of frame 4, stops 27 having no support causes bite leaf 26 to fold under upper frame 3 through slot 28 in belt 21 (FIG. 5).

FIG. 6B longitudinal section detail of hinging snow cleat 22 as it passes under frame 4, in a power mode, stop 27 holds bite leaf 26 in an extended mode pushing against snow 30.

FIG. 6C longitudinal section view of hinging snow cleat 22 in a non-powered mode at the bottom of frame 3, snow 30 has forced bite leaf to fold open in a slide mode.

Referring now to FIGS. 7,8,9 and, 9-A shows a light weight roll up sled 32 attached and powered by portable power-driver 1(FIG. 7). Sled 32 has a sleep bag like cover 33 with a sticky closure flap 34, the user would be in the sleeping bag setting on the inflatable cushion 35 (FIG. 9A) that is attached to the flexible plastic base 36 which is the sled bottom. He would stop the sled with brake 31 and controlling his direction with a guide bar 37 (FIG. 9B) which is attached to the guide fork 9, which will turn the power-driver 1 about pivot connection point 38. The engine is controlled by a hand throttle 18 and kill switch 19 which is attached to the end of control bar 37. By deflating cushion 35 bag 33, cushion 35 and, base 36 would roll up into compact carrier 39 (FIG. 9C) that would fit into the trunk of a car.

FIG. 7 perspective view of a roll-up inflatable sled 32 and power-driver unit 1.

FIG. 8 a partial top view showing the relationship of guide bar 37, fork 9 and pivot connector 38 to power unit 1 and sled 32.

FIG. 9 longitudinal cross section view of roll-up sled 32 and, a partial side view of the power unit and control bar 37.

FIG. 9A side view of inflatable sled 32 deflated and rolled into a carry/storage mode.

FIG. 10 a perspective view of a folding sled gurney 40, powered by the power-driver unit 1 consisting of a folding stretcher 41 which would attach to skis bindings with shoe bracket 42 and clamps 43. The system would be controlled by a user standing on top of the power unit frame 3 at with his feet at points 3A and 3B. By moving handle bars 44 user could turn gurney about pivot connection point 38, and control his forward speed with the hand throttle 18 and, kill switch 19.

FIG. 11 is a perspective view of a snow bike 50 riding on and attached to power-driver 1 by fork 9 having a quick disconnect clamp 51 that connects to bike frame 52 which has an adjustable passenger seat 53, and handle bars 44. The user controls his direction by turning the handle bars 44 which are connected to shaft 54 that is attached to shock absorber 55 which houses and is connected to shaft 56 that attaches to horizontal swivel point 57 that is connected to guide ski 58. The user setting on seat 53 astride frame 52 with feet placed on foot bars 59 and would control his forward speed with throttle 18 and kill switch 19.

FIG. 12 is a side view of power driver 1 attached to a snow board 60 by means of a pivot/connector 38. The user stands with one foot in bindings 61 on the snow board and the other foot in binding 62 centered over pivot/connector 38 and attached to the power unit 1. Direction is controlled by the user twisting his front foot at binding 61, engine is controlled with a hand held throttle 18 and kill switch 19 connected by cable 17.

FIG. 12A top view of snow board 60 showing placement of bindings 61, 62 and, the range of the snow board movement about pivot point 38 as 60A and 60B.

FIG. 13 is a side view of a power driver 63 equipped with an electric motor 64 powered with a quick replacement battery or fuel cell 65. System would be used in areas where air quality and noise would present a problem for a gasoline internal combustion system.

FIG. 13A perspective view of electric power driver 63 with battery of fuel cell extended for replacement.

FIG. 14 is a side view showing a smaller two cycle centrifugal clutch engine 66 that is attached to power pole 8 driving a wheel 67 by means of chain or friction system 68. The user stands astride the end of guide pole 8 having a padded seat 69 with skates on, and attaches belt harness 13 to eyelet 15 with a quick disconnect clip. Skater controls his direction by skating in a normal fashion and his speed by leaning forward at the shoulders to apply pressure to throttle cable 70. This type of control system allows the skater to use both of his hands to hold a hockey stick or to pass a ball. The wheel 67 could be studded with spikes for ice skating. If the wheel 67 should be stalled or be lifted from the ice a pressure switch returns the engine to idle.

FIG. 14A is a top view showing the configuration of seat 69 engine 66 and wheel 67.

What I claim is:

1. A thrust-delivery device, to deliver a driving thrust from a tractor to a connection to a belt adapted to be worn by a person, comprising:
   at least one pole having a first end, a second end, and a rigid body with a longitudinal dimension between said first and second ends, adapted as follows:
   a. said first end of said pole is adapted to connect to the tractor, to receive the driving thrust from the tractor, and to transmit that driving thrust through said longitudinal dimension of the body of said pole to said second end of said pole; and
   b. said second end of said pole is adapted
      (i) to be connected to the belt when the belt is worn by the person, and
      (ii) to deliver through the connection to the belt worn by the person the driving thrust from the tractor, such that said second end of said pole pulls a person forward under the driving thrust from the tractor.

2. The thrust-delivery device of claim 1, further comprising:
   said connection between said second end of said pole of said thrust-delivery device and the belt is flexible and rotatable.

3. The thrust-delivery device of claim 1 further comprising:
   a connection between the first end of said pole and the tractor such that said pole acts as a lever to turn the tractor's direction of travel upon lateral application of force by the skier.

4. The thrust-delivery device of claim 1, further comprising:
   said device is adapted to deliver the driving thrust from the tractor to the belt when worn by a person who is using any device selected from the group consisting of skis, skates, a snow board, and a skate board.

5. The thrust-delivery device of claim 1, further comprising:
   the longitudinal dimension of said rigid body of said pole is adjustable by the person.

6. A device, to deliver to a person's body a driving pull received from a rigid pole having a first end and a second end, said first end of said pole being adapted to receive and transmit a driving thrust from a tractor, comprising:
   a belt which is adapted to be connected, when worn by a person, to the second end of the rigid pole, such that the second end of the rigid pole pulls said belt, and the body of a person wearing said belt, forward under the driving thrust from the tractor.

7. The device of claim 6, further comprising:
   a harness connected to said belt which controls the location of said belt on a person's body and thereby controls the location at which said belt applies to the person's body the pulling force received from the rigid pole.

8. The harness of claim 7, further comprising:
   connections adapting said harness to attach to a tractor, such that said tractor can be carried on the back of a person wearing said harness.

9. A tractor which employs revolving crawler treads for impelling the tractor on a travelling surface and which is adapted to deliver driving motive power to propel a person who is riding on skis, skates or equivalent devices, further comprising:
   at least one cleat rotatably attached to the crawler treads of the tractor such that
   A. said cleat rotates outward to engage the travelling surface and provide traction to the treads when the tractor's speed over the travelling surface is equal to or less than the speed at which the crawler treads revolve relative to the travelling surface; and
   B. said cleat rotates inward to disengage from the travelling surface and present a runner surface on the crawler treads when the tractor's speed over the travelling surface exceeds the speed at which the crawler's treads revolve relative to the travelling surface.

10. The tractor of claim 9, wherein
    A. said tractor is portable,
    B. said tractor's weight is no greater than can be carried on a person's back, and
    C. said tractor further is adapted to be attached to a harness to bind said tractor onto the back of a person for carriage.

11. The tractor of claim 9, further comprising:
    a collapsible sled adapted to be attached to and moved by said tractor.

12. The tractor of claim 9, wherein:
    said tractor has an engine, and
    said engine bears control devices operable by a user, and
    at least one wire which is adapted to reach from said control devices to the person wearing said belt and further is adapted to enable a person to operate said control devices on said engine.

13. The tractor of claim 12, wherein:
    said wire is adapted to reach from the control devices on the engine to at least one hand of a person wearing said belt and to enable a person to operate said control devices by hand.

14. The tractor of claim 12, wherein:
    said wire is adapted to reach from said control devices on the engine to the upper body of the person wearing said belt and to transmit motion of the person's upper body as an operational signal to said control devices.

15. A crawler tractor to be portable by a person and further comprising:
    A. said tractor's weight is no greater than can be carried on a person's back, and
    B. the thrust-delivery device of claim 1; and
    C. a harness which is adapted to receive and hold both said tractor and said thrust-delivery device of claim 1, and further is adapted to bind them onto the back of the person for carriage.

* * * * *